(12) United States Patent
Veselic

(10) Patent No.: US 7,738,928 B2
(45) Date of Patent: Jun. 15, 2010

(54) INTEGRATED SWITCH-MODE POWER SUPPLY AND LINEAR REGULATOR

(75) Inventor: Dusan Veselic, Oakville (CA)

(73) Assignee: Research In Motion Limited, Waterloo, ON (CA)

( * ) Notice: Subject to any disclaimer, the term of this patent is extended or adjusted under 35 U.S.C. 154(b) by 876 days.

(21) Appl. No.: 11/524,468

(22) Filed: Sep. 21, 2006

(65) Prior Publication Data

US 2008/0076484 A1    Mar. 27, 2008

(51) Int. Cl.
*H04B 1/38* (2006.01)
*H04M 1/00* (2006.01)
*H01Q 11/12* (2006.01)
*H04B 1/04* (2006.01)

(52) U.S. Cl. .................................... 455/572; 455/127.1

(58) Field of Classification Search .................. 455/572, 455/127.1, 127.2, 127.5, 169.1, 195.1
See application file for complete search history.

(56) References Cited

U.S. PATENT DOCUMENTS 6,441,591 B2    8/2002    Nokkonen

2002/0121882 A1    9/2002    Matsuo et al.
2004/0178776 A1    9/2004    Hansen et al.
2005/0242792 A1    11/2005    Zinn

FOREIGN PATENT DOCUMENTS

WO         2005038920 A        4/2005

*Primary Examiner*—Eugene Yun
(74) *Attorney, Agent, or Firm*—Borden Ladner Gervais LLP; Jeffrey W. Wong

(57) ABSTRACT

A power supply includes a switching voltage regulator, and a linear voltage regulator coupled electrically in series with the switching voltage regulator. The switching voltage regulator includes a first input for receiving a DC input signal, a semiconductor switching stage coupled to the first input and configured to provide a first DC voltage signal from the received DC input signal. The magnitude of the first DC voltage signal is less than the received DC input signal. The linear voltage regulator includes a semiconductor current pass stage coupled to the output of the semiconductor switching stage and configured to provide a constant second DC output voltage signal from the first DC voltage signal. The voltage regulators are implemented together within a common integrated circuit housing.

20 Claims, 5 Drawing Sheets

INTEGRATED SWITCH-MODE POWER SUPPLY AND LINEAR REGULATOR

FIELD OF THE INVENTION

This invention relates to a low noise, high efficiency power supply. In particular, this invention relates to a two-stage power supply suitable for powering RF circuitry.

BACKGROUND OF THE INVENTION

RF circuitry is prone to producing communication errors from noise and/or transients in the RF power supply. As a result, the power supplies used in mobile wireless communications devices must be able to provide a steady supply voltage with minimal noise.

Due to their inherent low noise characteristics, RF sections in mobile wireless communications devices are typically powered by a linear voltage regulator. However, linear voltage regulators are typically very inefficient. When the mobile communication device is in a sleep or low power consumption mode, the inefficiency of the linear voltage regulator is of minimal concern. However, when the RF section of the mobile communication device is active, the inefficiency of the linear voltage regulator can dramatically shorten battery life of the device.

In contrast to linear power supplies, switch-mode power supplies (SMPSs) or push-pull voltage regulators, are typically at least 90% efficient. However, due to the noise generated from their switching transistors, SMPSs are generally not desirable for use with RF sections. Therefore, attempts have been made to devise a more efficient low-noise power supply suitable for use with the RF section of a mobile wireless communication device.

For instance, Nokkonen (U.S. Pat. No. 6,441,591) describes a power supply that includes a battery, a SMPS and a linear voltage regulator each coupled to the battery, and a SMPS controller connected to the SMPS. The SMPS controller is configured with two operational modes. In the first mode (activated when the load current is high), the SMPS is active, and the linear voltage regulator is powered by the SMPS. In the second mode (activated when the load current is low), the SMPS is inactive, and the linear voltage regulator is powered by the battery.

Since the efficiency of a linear voltage regulator diminishes with the voltage drop across the regulator, the voltage applied to the input of the linear regulator during the first (high current mode) is greater than the voltage applied during the second (low current mode). Therefore, the efficiency of the power supply is limited by the ability of the SMPS controller to select the appropriate operational mode based on the prevailing load current.

SUMMARY OF THE INVENTION

According to a first aspect of the invention described herein, there is provided a power supply that includes a switching voltage regulator, and a linear voltage regulator coupled electrically in series with the switching voltage regulator. The switching voltage regulator includes a first input for receiving a DC input signal, a semiconductor switching stage coupled to the first input and configured to provide a first DC voltage signal from the received DC input signal. The magnitude of the first DC voltage signal is less than the received DC input signal.

The linear voltage regulator includes a semiconductor current pass stage coupled to the output of the semiconductor switching stage and configured to provide a constant second DC output voltage signal from the first DC voltage signal. The voltage regulators are implemented together within a common integrated circuit housing.

According to a second aspect of the invention described herein, there is provided a mobile wireless communications device that includes an antenna; a data processor; an RF section coupled to the antenna and the data processor for the communication of data between the antenna and the data processor; a battery for providing a DC input signal; and a power supply coupled to the battery and the RF section for supplying power to the RF section from the DC input signal.

In the second aspect of the invention, the power supply includes a switching voltage regulator, and a linear voltage regulator coupled electrically in series with the switching voltage regulator. The switching voltage regulator includes a semiconductor switching stage coupled to the battery and configured to provide a first DC voltage signal from the received DC input signal. The magnitude of the first DC voltage signal is less than the received DC input signal.

The linear voltage regulator includes a semiconductor current pass stage coupled to the output of the semiconductor switching stage and configured to provide a constant second DC output voltage signal from the first DC voltage signal. As above, the voltage regulators are implemented together within a common integrated circuit housing.

In one implementation, the power supply is devoid of a voltage control loop between the linear voltage regulator and the switching voltage regulator. Also, the switching voltage regulator is configured to maintain the magnitude of the first DC voltage signal at a voltage level sufficient for the linear voltage regulator to maintain the magnitude of the second DC output voltage signal within a predetermined range.

The semiconductor current pass stage includes a controlled voltage/current source, and a second feedback loop coupled to the controlled voltage/current source. Preferably, the controlled voltage/current source comprises a transistor, and the linear voltage regulator comprises a low dropout voltage regulator. The second feedback loop is configured to vary the magnitude of current from the voltage/current source based on the magnitude of the second DC output voltage signal.

The semiconductor switching stage includes a semiconductor switch, a port coupled to the semiconductor switch for coupling to a resonant circuit, and a first feedback loop coupled to the semiconductor switch. The first feedback loop is configured to vary the conduction interval of the semiconductor switch based on the magnitude of the first DC voltage signal.

In one implementation, the power supply includes a voltage controller that is connected, at its output, to the input of the first feedback loop. The first feedback loop is configured to vary the conduction interval of the semiconductor switch based on the magnitude of the first DC voltage signal and the voltage drop across the linear voltage regulator. The voltage controller, in co-operation with the first feedback loop, is configured to maintain the magnitude of the first DC voltage signal at a voltage level that is greater than the second DC output voltage signal by an amount at least equal to the dropout voltage of the linear voltage regulator.

With the foregoing circuit configurations, since the voltage regulators are implemented together within a common integrated circuit housing, changes in the electrical characteristics of the semiconductor devices that implement the switching voltage regulator (due to changes in environmental conditions) are mirrored in the semiconductor devices that implement the linear voltage regulator. As a result, the power supply is able to maintain the magnitude of the output voltage of the switching voltage regulator above the dropout voltage of the linear voltage regulator, but without the need for complex control circuitry.

BRIEF DESCRIPTION OF THE DRAWINGS

The invention will now be described in detail, by way of example only, with reference to the accompanying drawings, in which.

DETAILED DESCRIPTION OF THE PREFERRED EMBODIMENT

Figure 1:
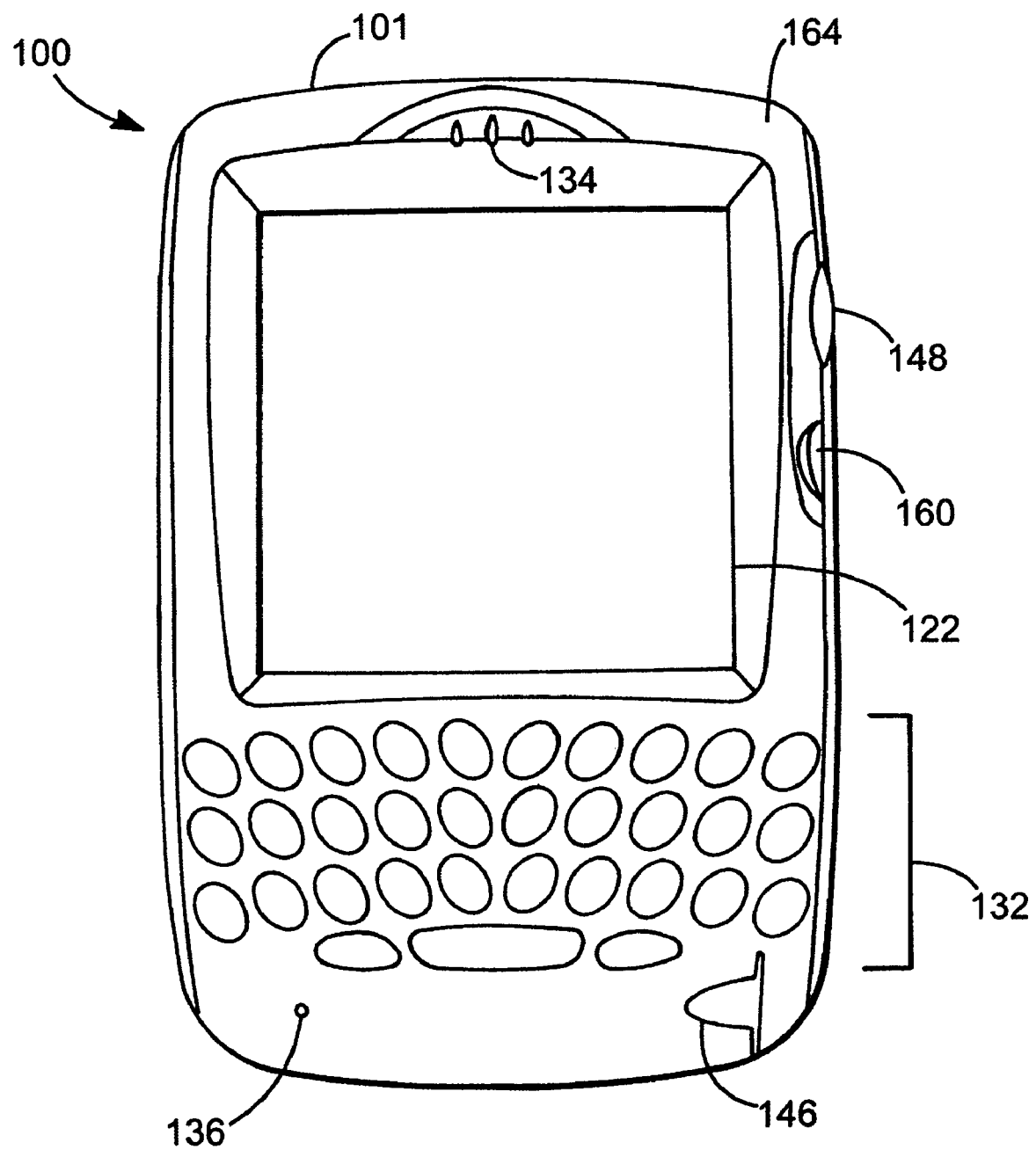
FIG. 1 is a front plan view of a handheld computing device having an integrated switch mode power supply and linear regulator, according to the invention described herein.

Referring now to FIG. 1, there is shown a handheld computing device, denoted generally as 100, provided according to one aspect of the invention. The handheld computing device 100 includes a display 122, a function key 146, and data processing means 102 (not shown) disposed within a common housing. The display 122 comprises a backlit display having a variable-intensity backlight. In one implementation, the backlit display 122 comprises a transmissive LCD display, and the function key 146 operates as a power on/off switch. Alternately, in another implementation, the backlit display 122 comprises a reflective or trans-reflective LCD display, and the function key 146 operates as a backlight switch.

Figure 2:
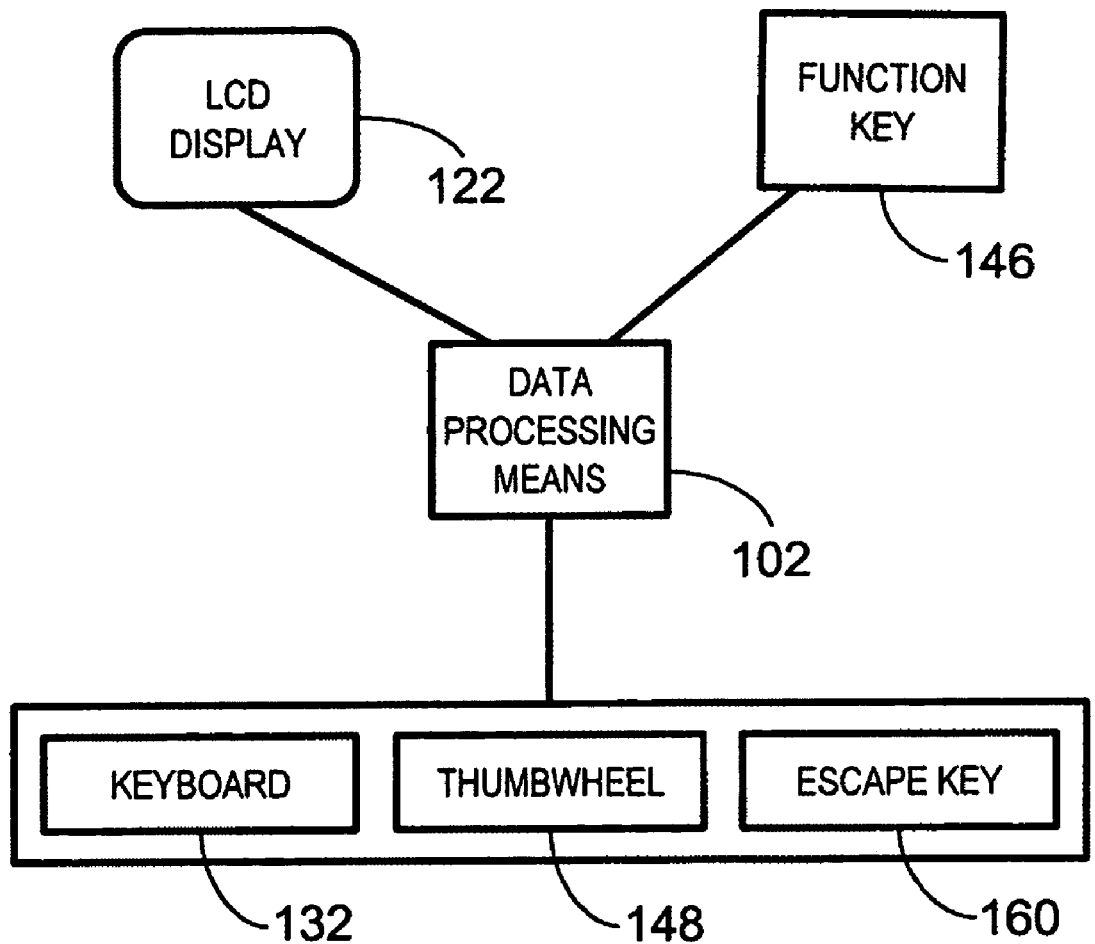
FIG. 2 is a schematic diagram depicting the communication pathways existing between the data processing means, the LCD display, the function key and the data input means of the handheld computing device depicted in FIG. 1.

As shown in FIG. 2, the data processing means 102 of the handheld computing device 100 is in communication with the display 122 and the function key 146. In addition to the display 122 and the function key 146, the handheld computing device 100 includes user data input means for inputting data to the data processing means 102. As shown, preferably the user data input means includes a keyboard 132, a thumbwheel 148 and an escape key 160. As will be described, the data processing means 102 comprises a microprocessor 138, and a memory 124, 126 (disposed within the housing). The memory 124, 126 carries computer processing instructions which, when accessed from the memory 124, 126 and executed by the microprocessor 138, implement an operating system and any communication-related functions, device-resident functions and/or applications software.

Typically, the handheld computing device 100 is a two-way wireless communication device having at least voice and data communication capabilities. Further, preferably the handheld computing device 100 has the capability to communicate with other computer systems on the Internet. Depending on the exact functionality provided, the wireless handheld computing device 100 may be referred to as a data messaging device, a two-way pager, a wireless e-mail device, a cellular telephone with data messaging capabilities, a wireless Internet appliance, or a data communication device, as examples.

Figure 3:
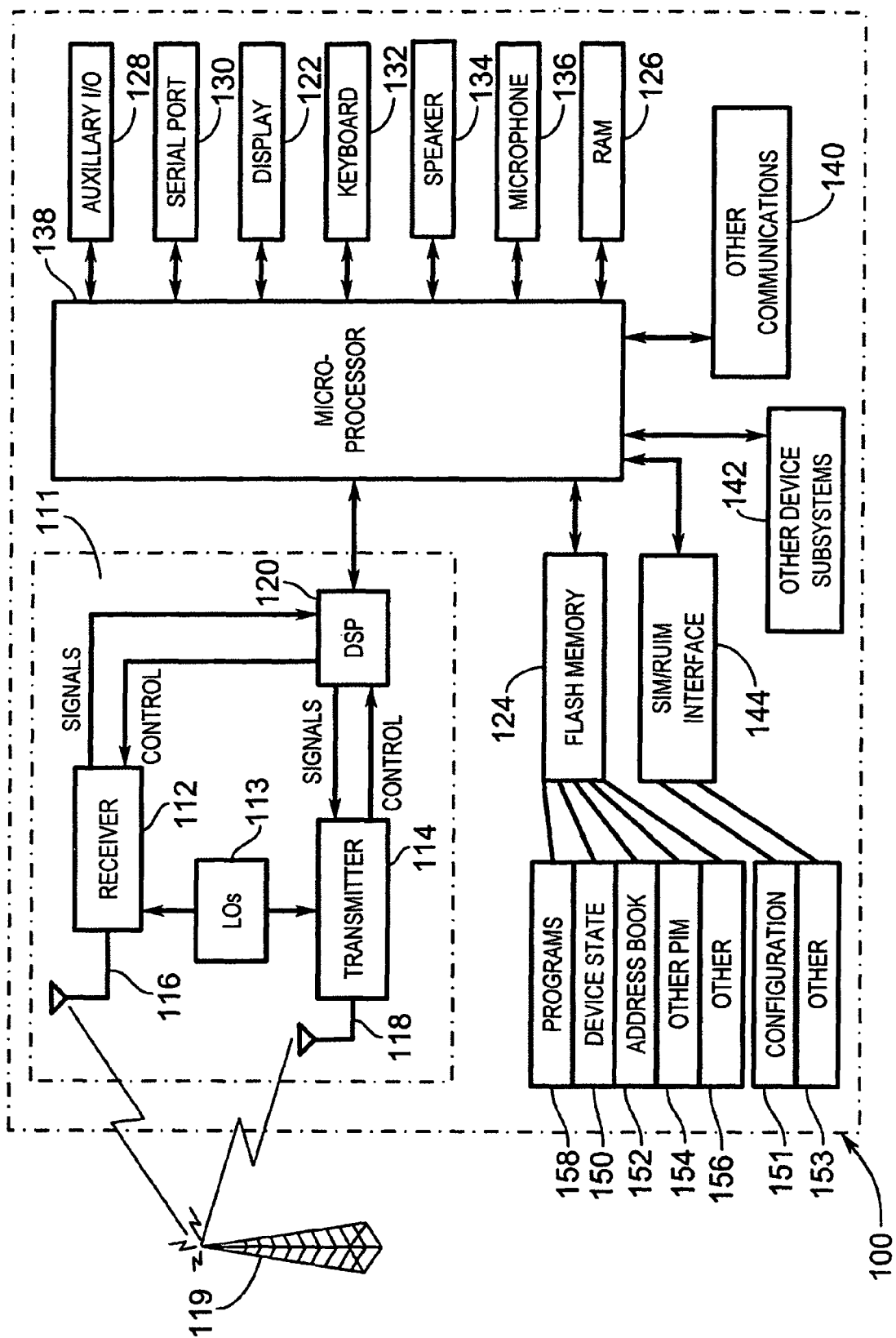
FIG. 3 is a schematic diagram depicting certain functional details of the handheld computing device.

FIG. 3 depicts functional details of the handheld computing device 100. Where the handheld computing device 100 is enabled for two-way communication, the motherboard 102 will incorporate a communication subsystem 111, including both a radio frequency (RF) receiver 112 and a RF transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, the handheld computing device 100 may include a communication subsystem 111 designed to operate within the Mobitex™ mobile communication system, the DataTAC™ mobile communication system, GPRS network, UMTS network, EDGE network or CDMA network.

When required network registration or activation methods have been completed, the handheld computing device 100 may send and receive communication signals over the network 119. Signals received by antenna 116 through communication network 119 are input to RF receiver 112, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to RF transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in RF receiver 112 and RF transmitter 114 may be adaptively controlled through automatic gain control algorithms implemented in DSP 120.

The handheld computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Typically, the communication subsystem 111, flash memory 124, RAM 126, I/O subsystems 128, serial port 130, keyboard 132, speaker 134, microphone 136, microprocessor 138, and the subsystems 140, 142 are provided on the motherboard 102, and the display 122 is provided as a self-contained unit that is physically mounted, and electrically connected, to the motherboard 102.

The operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. Received communication signals may also be stored in RAM 126.

As shown, the flash memory 124 can be segregated into different areas for both computer programs 158 and program data storage 150, 152, 154 and 156. These different storage areas indicate that each program can allocate a portion of flash memory 124 for their own data storage requirements.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of the handheld computing device 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the handheld computing device 100 is similar, except that received signals would preferably be output to a speaker 134 and signals for transmission would be generated by a microphone 136.

Preferably, the RF transmitter 112 and the RF receiver 114 of the communication subsystem 111 are powered by a common power supply. The power supply is provided as an integrated circuit that is mounted on the motherboard 102. Preferred embodiments of the power supply are depicted in FIGS. 4 and 5.

Figure 4:
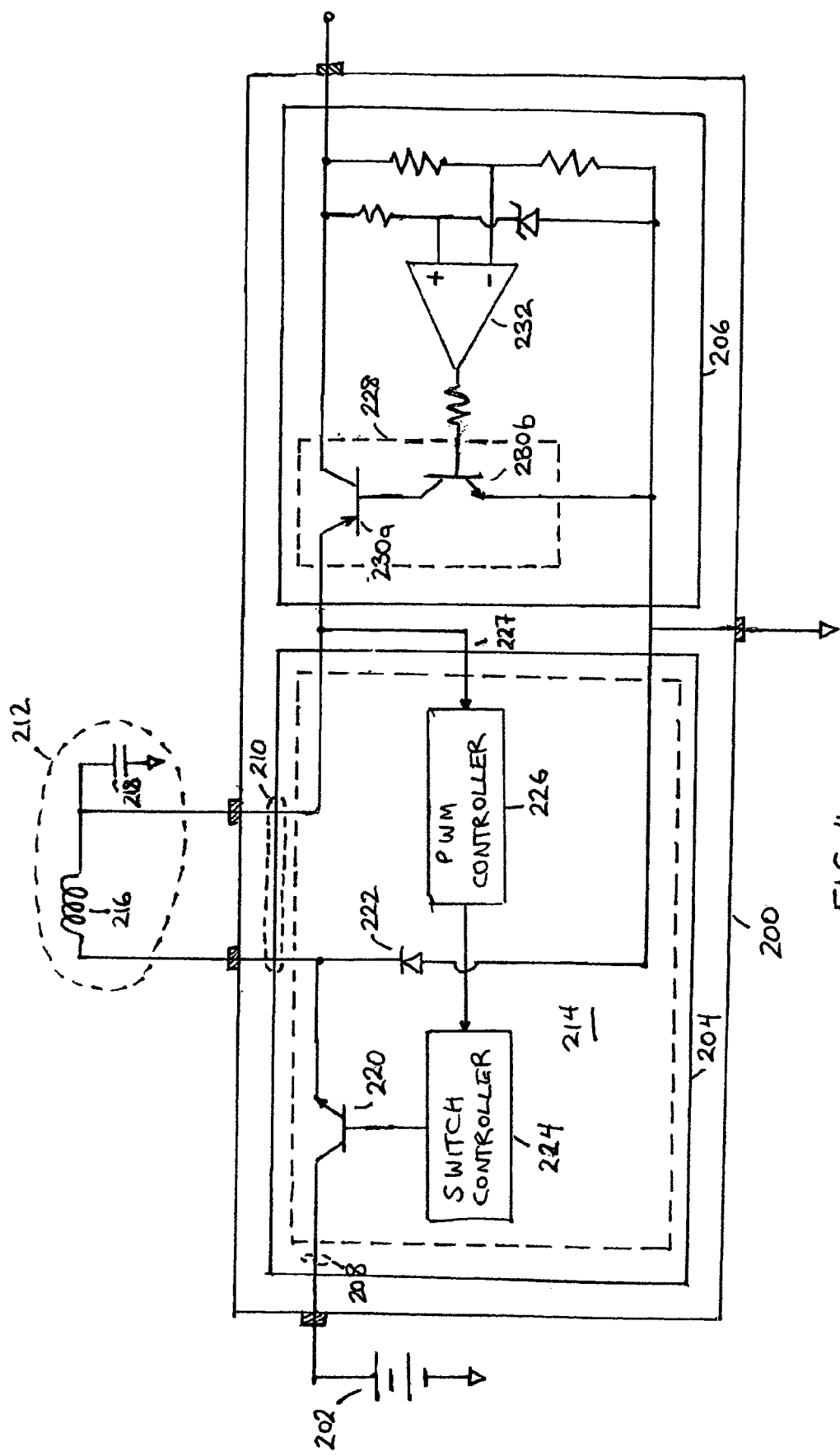
FIG. 4 is a schematic diagram depicting the functional elements of one embodiment of the integrated switch mode power supply and linear regulator.
Figure 5:
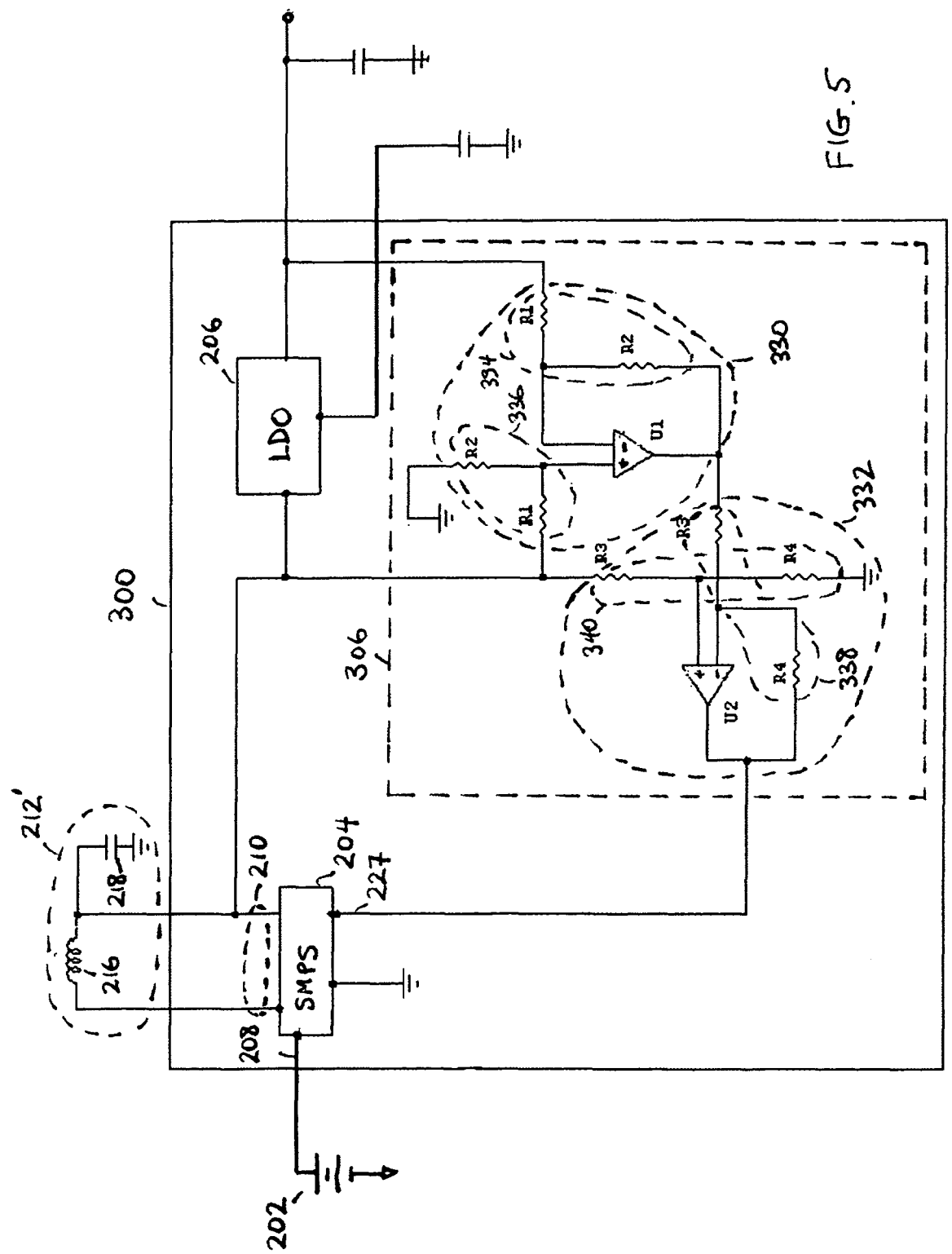
FIG. 5 is a schematic diagram depicting the functional elements of another embodiment of the integrated switch mode power supply and linear regulator.

The power supply 200, shown in FIG. 4, is powered by a battery 202 that is disposed within the housing of the handheld computing device 100, and comprises a switching voltage regulator (SMPS or switch mode power supply) 204, and a linear voltage regulator 206. The switching voltage regulator 204 and the linear voltage regulator 206 are integrated together into a common integrated circuit housing.

The linear voltage regulator 206 is coupled electrically in series, at its input, with the output of the switching voltage regulator 204. However, as shown, preferably the power supply 200 is devoid of a voltage control loop between the linear voltage regulator 206 and the switching voltage regulator 204.

The switching voltage regulator 204 comprises a first input 208 for receiving a DC voltage from the battery 202, a resonant circuit port 210 for coupling to a resonant circuit 212, and a semiconductor switching stage 214 coupled to the first input 208 and the resonant circuit port 210.

As shown, the resonant circuit 212 includes a fixed inductor 216 and a capacitor 218. The resonant circuit 212 is provided on the motherboard 102, but is disposed externally to the power supply 200.

To maximize the efficiency of the power supply 200, ideally the magnitude of the voltage at the output of the switching voltage regulator 204 is less than the magnitude of the battery voltage. Accordingly, preferably the switching voltage regulator 204 is configured as a buck-type regulator. However, the switching voltage regulator 204 may have a different configuration. For instance, the switching voltage regulator 204 may be configured as a boost-type regulator where the magnitude of the voltage at the output of the switching voltage regulator 204 is required to be greater than the magnitude of the battery voltage.

In the buck-type configuration shown, the semiconductor switching stage 214 comprises a transistor switch 220 connected between the first input 208 and the resonant circuit 212, a free-wheeling diode 222 connected across the resonant circuit 212, and a switch control circuit 224 connected to the gate input of the transistor switch 220. The switch control circuit 224 applies gating signals to the gate input to thereby cyclically turn the transistor switch 220 on and off.

Preferably, the switching voltage regulator 204 also includes a first feedback loop for controlling the DC output voltage of the switching voltage regulator 204. In the example shown, the switching voltage regulator 204 includes a feedback control input 227 that is connected to the output of the switching voltage regulator 204, and the first feedback loop is implemented using a pulse-width controller 226 that is disposed between the switch control circuit 224 and the feedback control input 227. The pulse-width controller 226 adjusts the conduction interval of the transistor switch 220 based on the magnitude of the voltage at the output of the switching voltage regulator 204 (as measured at the feedback control input 227).

With the foregoing configuration, the switching voltage regulator 204 maintains the magnitude of the DC voltage signal at the output of the semiconductor switching stage 214 substantially constant.

The linear voltage regulator 206 is configured to provide a constant DC output voltage signal from the first DC voltage signal that is output from the switching voltage regulator 204. As shown, the linear voltage regulator 206 comprises a semiconductor current pass stage 228 that is coupled to the output of the semiconductor switching stage 214.

To maximize the efficiency of the power supply 200, preferably the linear voltage regulator 206 is configured as a low-dropout (LDO) voltage regulator. However, the linear voltage regulator 206 may have a different configuration.

In the low-dropout configuration shown, the semiconductor current pass stage 228 comprises a transistor 230, and a feedback loop for controlling the DC output voltage of the linear voltage regulator 206. In the example shown, the second feedback loop is implemented using an operational amplifier 232 that is disposed between the base of the transistor 230 and the output of the linear voltage regulator 206. The transistor 230 acts as a voltage/current source, and the operational amplifier 232 varies the magnitude of current through the voltage/current source based on the magnitude of the voltage at the output of the linear voltage regulator 206.

The linear voltage regulator 206 is configured to maintain the magnitude of the voltage at the output of the linear voltage regulator 206 within a predetermined range. However, to ensure that the linear voltage regulator 206 is able to maintain the output voltage of the within the predetermined range, the switching voltage regulator 204 is configured to maintain the voltage at the output of the semiconductor switching stage 214 above the output voltage of the power supply 200 by an amount at least equal to the dropout voltage of the linear regulator 206.

Turning now to FIG. 5, the power supply 300 shown therein is powered by the battery 202 that is disposed within the housing of the handheld computing device 100, and comprises the switching voltage regulator 204, the linear voltage regulator 206, and a voltage controller 306. The switching voltage regulator 204, the linear voltage regulator 206, and the voltage controller 306 are integrated together into a common integrated circuit housing.

The linear voltage regulator 206 is coupled electrically in series, at its input, with the output of the switching voltage regulator 204. The voltage controller 206 is connected between the switching voltage regulator 204 and the linear voltage regulator 206.

As discussed above, the linear voltage regulator 206 is configured to provide a constant DC output voltage signal from the first DC voltage signal that is output from the switching voltage regulator 204. To ensure that the linear voltage regulator 206 is able to do so, the voltage controller 306 is connected at its output to the feedback control input 227 of the switching voltage regulator 204, to thereby maintain the voltage at the output of the switching voltage regulator 204 above the output voltage of the power supply 300 by an amount that is at least equal to the dropout voltage of the linear regulator 206. However, to enhance the efficiency of the power supply 300, preferably the voltage controller 306 maintains the output voltage of the switching voltage regulator 204 at a magnitude that is equal to the sum of the output voltage of the linear regulator 206 and the voltage drop across the linear regulator 206.

Accordingly, the voltage controller 306 is configured to continuously measure the voltage drop across the linear voltage regulator 206, and to adjust the output voltage of the switching voltage regulator 204 based on the output voltage of the switching voltage regulator 204 and the measured voltage drop of the linear voltage regulator 206.

As shown, the voltage controller 306 comprises a voltage comparator 330, and a voltage adder 332. The voltage comparator 330 comprises a differential amplifier U1, a first voltage divider 334 (comprising resistors R1, R2) connected to the inverting input of the differential amplifier U1, and a second voltage divider 336 (comprising resistors R1, R2) connected to the non-inverting of the differential amplifier U1. The voltage adder 332 comprises a differential amplifier U2, a third voltage divider 338 (comprising resistors R3, R4) connected to the inverting input of the differential amplifier U2, and a fourth voltage divider 340 (comprising resistors R3, R4) connected to the non-inverting of the differential amplifier U2.

As will be apparent from the foregoing resistor nomenclature, the resistance of the resistor R1 of the first voltage divider 334 is equal to the resistance of the resistor R1 of the second voltage divider 336. Similarly, the resistance of the resistor R2 of the first voltage divider 334 is equal to the resistance of the resistor R2 of the second voltage divider 336. Similar comments apply to the resistors R3 of the third and fourth voltage dividers 338, 340, and the resistors R4 of the third and fourth voltage dividers 338, 340.

The voltage comparator 330 is connected at its inverting input to the voltage output of the linear voltage regulator 206 (via the resistor R1 of the first voltage divider 334), and is connected at its non-inverting input to the voltage output of the switching voltage regulator 204 (via the resistor R1 of the second voltage divider 336). Therefore, the voltage output by the voltage comparator 330 is proportional to the voltage drop across the linear voltage regulator 206.

The voltage adder 332 is connected at its inverting input to the voltage output of the voltage comparator 330 (via the resistor R3 of the third voltage divider 340), and is connected at its non-inverting input to the voltage output of the switching voltage regulator 204 (via the resistor R3 of the fourth voltage divider 340). The voltage adder 332 is connected at its output to the feedback control input 328 of the switching voltage regulator 204. Therefore, the voltage at the feedback control input 227 is proportional to the difference between the voltage output by the switching voltage regulator 204 and the voltage drop across the linear voltage regulator 206.

In particular:

$$V_{330}=(R2/R1) \times V_{DROP\_LDO};$$

$$V_{332}=(R4/R3) \times (V_{SMPS}-V_{330});$$

where:
$V_{330}$ is the voltage output by the voltage comparator 330;
$V_{332}$ is the voltage output by the voltage adder 332;
$V_{DROP\_LDO}$ is the voltage drop across the linear voltage regulator 206; and
$V_{SMPS}$ is voltage output by the switching voltage regulator 204

Preferably, (R2/R1)=(R4/R3)=1, so that $V_{332}=(V_{SMPS}-V_{DROP\_LDO})$

In configuration shown in FIG. 5, the switching voltage regulator 204 still maintains the magnitude of the DC voltage signal at the output of the semiconductor switching stage 214 substantially constant. However, since the feedback control input 227 is connected to the output of the voltage controller 306 (as opposed to the output of the switching voltage regulator 204), the first feedback loop of the switching voltage regulator 204 increases the output voltage of the switching voltage regulator 204 by the voltage drop across the linear regulator 206.

In other words, the switching voltage regulator 204 maintains its output voltage at a magnitude that is equal to the sum of the output voltage of the power supply 300 and the voltage drop across the linear regulator 206. In this manner, the voltage controller 306 is able to maintain the voltage at the output of the switching voltage regulator 204 above the output voltage of the power supply 300 by an amount that is at least equal to the dropout voltage of the linear regulator 206.

With each of the foregoing circuit configurations, since the voltage regulators 204, 206 (and the voltage controller 306, if used) are implemented together within a common integrated circuit housing, the semiconductor devices contained therein are all exposed to the same environmental conditions, such as ambient temperature and humidity. As a result, changes in the electrical characteristics of the semiconductor devices that implement the switching voltage regulator 204 (due to changes in environmental conditions) are mirrored in the semiconductor devices that implement the linear voltage regulator 206 (and the voltage controller 306).

The resulting matching of electrical characteristics allows the switching voltage regulator 204 to maintain the magnitude of the output voltage of the switching voltage regulator 204 above the dropout voltage of the linear voltage regulator 206. In the embodiment shown in FIG. 4, this result is achieved without a voltage control loop between the linear voltage regulator 206 and the switching voltage regulator 204. In the embodiment shown in FIG. 5, this result is achieved using a simple adder circuit between the linear voltage regulator 206 and the switching voltage regulator 204. In each embodiment, the power supply 200 is able to maintain the output voltage of the linear voltage regulator 206 substantially constant, without using complex control circuitry.

The scope of the monopoly desired for the invention is defined by the claims appended hereto, with the foregoing description being merely illustrative of the preferred embodiment of the invention. Persons of ordinary skill may envisage modifications to the described embodiment which, although not explicitly suggested herein, do not depart from the scope of the invention, as defined by the appended claims.

I claim:
1. A power supply comprising:
a switching voltage regulator, the switching voltage regulator comprising a first input for receiving a DC input signal, a semiconductor switching stage coupled to the first input and being configured to provide a first DC voltage signal from the received DC input signal, a magnitude of the first DC voltage signal being less than the received DC input signal; and a linear voltage regulator coupled electrically in series with the switching voltage regulator, the linear voltage regulator comprising a semiconductor current pass stage coupled to an output of the semiconductor switching stage and being configured to provide a constant second DC output voltage signal from the first DC voltage signal, wherein the power supply is devoid of a voltage control loop between the linear voltage regulator and the switching voltage regulator.

2. The power supply according to claim 1, wherein the voltage regulators are implemented together within a common integrated circuit housing.

3. The power supply according to claim 1, wherein the switching voltage regulator is configured to maintain a magnitude of the first DC voltage signal at a voltage level sufficient for the linear voltage regulator to maintain a magnitude of the second DC output voltage signal within a predetermined range.

4. The power supply according to claim 3, wherein the semiconductor current pass stage comprises a controlled current source, and a second feedback loop coupled to the controlled current source, the second feedback loop being configured to vary a magnitude of current from the current source based on a magnitude of the second DC output voltage signal.

5. The power supply according to claim 4, wherein the controlled current source comprises a transistor, and the linear voltage regulator comprises a low dropout voltage regulator.

6. A mobile wireless communications device comprising:
an antenna;
a data processor;
an RF section coupled to the antenna and the data processor for the communication of data between the antenna and the data processor;
a battery for providing a DC input signal; and
a power supply coupled to the battery and the RF section for supplying power to the RF section from the DC input signal, the power supply including:
a switching voltage regulator, the switching voltage regulator comprising a semiconductor switching stage coupled to the battery and being configured to provide a first DC voltage signal from the received DC input signal, a magnitude of the first DC voltage signal being less than the received DC input signal; and
a linear voltage regulator coupled electrically in series with the switching voltage regulator, the linear voltage regulator comprising a semiconductor current pass stage coupled to an output of the semiconductor switching stage and being configured to provide a constant second DC output voltage signal from the first DC voltage signal,
wherein the power supply is devoid of a voltage control loop between the linear voltage regulator and the switching voltage regulator.

7. The mobile wireless communications device according to claim 6, wherein the voltage regulators are implemented together within a common integrated circuit housing.

8. The mobile wireless communications device according to claim 7, wherein the switching voltage regulator is configured to maintain a magnitude of the first DC voltage signal at a voltage level sufficient for the linear voltage regulator to maintain a magnitude of the second DC output voltage signal within a predetermined range.

9. The mobile wireless communications device according to claim 8, wherein the semiconductor current pass stage comprises a controlled current source, and a second feedback loop coupled to the controlled current source, the second feedback loop being configured to vary a magnitude of current from the current source based on a magnitude of the second DC output voltage signal.

10. The mobile wireless communications device according to claim 9, wherein the controlled current source comprises a transistor, and the linear voltage regulator comprises a low dropout voltage regulator.

11. A power supply comprising:
a switching voltage regulator, the switching voltage regulator comprising a first input for receiving a DC input signal, a semiconductor switching stage coupled to the first input and being configured to provide a first DC voltage signal from the received DC input signal, a magnitude of the first DC voltage signal being less than the received DC input signal;
a linear voltage regulator coupled electrically in series with the switching voltage regulator, the linear voltage regulator comprising a semiconductor current pass stage coupled to an output of the semiconductor switching stage and being configured to provide a constant second DC output voltage signal from the first DC voltage signal; and
a voltage controller disposed between the linear voltage regulator and the switching voltage regulator and configured to maintain a magnitude of the first DC voltage signal at a voltage level sufficient for the linear voltage regulator to maintain a magnitude of the second DC output voltage signal within a predetermined range.

12. The power supply according to claim 11, wherein the voltage regulators and the voltage controller are implemented within a common integrated circuit housing.

13. The power supply according to claim 11, wherein the voltage controller is configured to maintain the magnitude of the first DC voltage signal at a voltage that is greater than the magnitude of the second DC output voltage signal by an amount at least equal to a dropout voltage of the linear voltage regulator.

14. The power supply according to claim 13, wherein the maintained voltage is equal to the magnitude of the second DC output voltage signal and a voltage drop across the linear voltage regulator.

15. The power supply according to claim 11, wherein the semiconductor switching stage includes a semiconductor switch, a port coupled to the semiconductor switch for coupling to a resonant circuit, and a first feedback loop coupled to the semiconductor switch, the first feedback loop being configured to vary a conduction interval of the semiconductor switch based on the magnitude of the first DC voltage signal.

16. A mobile wireless communications device comprising:
an antenna;
a data processor;
an RF section coupled to the antenna and the data processor for the communication of data between the antenna and the data processor;
a battery for providing a DC input signal; and
a power supply coupled to the battery and the RF section for supplying power to the RF section from the DC input signal, the power supply including:
a switching voltage regulator, the switching voltage regulator comprising a semiconductor switching stage coupled to the battery and being configured to provide a first DC voltage signal from the received DC input signal, a magnitude of the first DC voltage signal being less than the received DC input signal;
a linear voltage regulator coupled electrically in series with the switching voltage regulator, the linear voltage regulator comprising a semiconductor current pass stage coupled to an output of the semiconductor switching stage and being configured to provide a constant second DC output voltage signal from the first DC voltage signal; and a voltage controller disposed between the linear voltage regulator and the switching voltage regulator and configured to maintain a magnitude of the first DC voltage signal at a voltage level sufficient for the linear voltage regulator to maintain a magnitude of the second DC output voltage signal within a predetermined range.

17. The mobile wireless communications device according to claim 16, wherein the voltage regulators and the voltage controller are implemented within a common integrated circuit housing.

18. The mobile wireless communications device according to claim 16, wherein the voltage controller is configured to maintain the magnitude of the first DC voltage signal at a voltage that is greater than the magnitude of the second DC output voltage signal by an amount at least equal to a dropout voltage of the linear voltage regulator.

19. The mobile wireless communications device according to claim 18, wherein the maintained voltage is equal to the magnitude of the second DC output voltage signal and a voltage drop across the linear voltage regulator.

20. The mobile wireless communications device according to claim 16, wherein the semiconductor switching stage includes a semiconductor switch, a port coupled to the semiconductor switch for coupling to a resonant circuit, and a first feedback loop coupled to the semiconductor switch, the first feedback loop being configured to vary a conduction interval of the semiconductor switch based on the magnitude of the first DC voltage signal.

* * * * *